United States Patent

Gunsher

[11] 3,761,543
[45] Sept. 25, 1973

[54] POLYPHOSPHORUS ESTERS
[75] Inventor: Jeffrey A. Gunsher, Midland, Mich.
[73] Assignee: The Dow Chemical Company, Midland, Mich.
[22] Filed: July 14, 1972
[21] Appl. No.: 272,003

Related U.S. Application Data
[63] Continuation-in-part of Ser. No. 863,704, Oct. 3, 1969.

[52] U.S. Cl.................... 260/929, 252/8.1, 260/930
[51] Int. Cl............................. C07f 9/08, C07f 9/14
[58] Field of Search............................ 260/930, 929

[56]  References Cited
UNITED STATES PATENTS
2,674,590  4/1954  Zenftman...................... 260/930 X Primary Examiner—Lewis Gotts
Assistant Examiner—Richard L. Raymond
Attorney—William M. Yates et al.

[57]  ABSTRACT

Compounds having the general formula

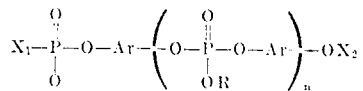

wherein
R = neopentyl, halogenated neopentyl, phenyl or halogenated phenyl; wherein each halogen is independently Br or Cl;
Ar = isopropylidenediphenylene, halogenated isopropylidenediphenylene, oxydiphenylene, halogenated oxydiphenylene, biphenylene, halogenated biphenylene, phenylene and halogenated biphenylene; wherein each halogen is independently Br or Cl; provided that at least one R or Ar is halogenated;

$X_1$ = Cl, Br, I, OR, OArOH;

$X_2$ = H or $-\overset{O}{\underset{|}{P}}-A$, where A = Cl, Br, I or OR; and $n = 1-9$ are excellent fire retardants and may be prepared from phosphorus oxyhalide by a two step addition.

4 Claims, No Drawings

POLYPHOSPHORUS ESTERS

CROSS-REFERENCE TO OTHER APPLICATION

This is a continuation-in-part of my pending U.S. patent application Ser. No. 863,704, filed Oct. 3, 1969, now abandoned.

BACKGROUND OF THE INVENTION

Trialkyl phosphates are well known and readily available by the reaction of alcohols with phosphorus oxychloride in the presence of a tertiary nitrogen base. Halogenated organic phosphates such as tris[2,2,2-tris(bromomethyl)ethyl]phosphate have been prepared by Carpenter and Witt in U.S. Pat. No. 3,324,205. This and other similar compounds are relatively volatile and when used as fire retardants have a very short effective life.

Sandner and Fierce have reacted phosphorus oxychloride with polar polyhydric compounds as shown in U.S. Pat. No. 2,978,478. Bisphenol A has also been reacted with phosphorus oxychloride to produce a polymeric material having a relatively high molecular weight. Although these compounds are not as volatile as the compounds prepared by Carpenter and Witt, they are essentially insoluble in organic solvents and therefore cannot be readily added to a substrate to impart fire retardant properties.

The properties exhibited by these two compounds are indicative of those exhibited by similar compounds which have proposed use as fire retardants. Either the volatility is relatively high and the effective fire retardant life is low or the molecular weight is high but the compound cannot be readily added to a substrate because of its low solubility.

SUMMARY OF THE INVENTION

According to the present invention, the disadvantages demonstrated in the art are overcome by compounds having the general formula

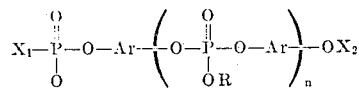

wherein
R = neopentyl, halogenated neopentyl, phenyl or halogenated phenyl; wherein each halogen is independently Br or Cl;
Ar = isopropylidenediphenylene, halogenated isopropylidenediphenylene, oxydiphenylene, halogenated oxydiphenylene, biphenylene, halogenated biphenylene, phenylene and halogenated biphenylene; wherein each halogen is independently Br or Cl; provided that at least one R or Ar is halogenated;

$X_1$ = Cl, Br, I, OR, OArOH;

$X_2$ = H or $-\overset{O}{\underset{|}{\overset{\|}{P}}}-A$, where A = Cl, Br, I or OR; and n = 1-9.

The compounds of the present invention have a low volatility, a high temperature of degradation, degradation products of low volatility, and good solubility characteristics in a number of standard organic solvents. As a result of these unique properties, the compounds are easily added to a substrate to impart fire retardant properties and the effective life of the fire retardancy is greater than that provided by similar compounds known in the art.

The compounds of the present invention are easily prepared by a two-step process in a manner generically shown by Kosolapoff, Organophosphorus Compounds, John Wiley and Sons, Inc., 1950. In the first step, a phosphorus oxyhalide is reacted in the presence of a tertiary nitrogen base with an essentially equal molar amount of the monohydric alcohol or phenol. In the second step of the reaction, the product of the first step is reacted with an essentially equal molar amount of a dihydroxy compound such as Bisphenol A, dihydroxydiphenyl oxide or hydroquinone until the desired molecular weight is obtained. Halogenated compounds are preferred and may be prepared by using halogenated reactants in the two-step reaction above or by using at least partially unhalogenated hydroxylated reactants in the reaction above and then halogenating the final product with chlorine, bromine, bromine chloride or another suitable halogenating agent. Although the compounds of the present invention are prepared according to a standard reaction, the method of adding the substituents is new and the properties of the resultant compound, especially as fire retardant agents, are superior to similar compounds.

The monohydric compound reacted with the phosphorus oxychloride in the present invention may be neopentyl alcohol, phenol or their respective halogenated substitution products. Halogen is herein defined to mean bromine or chlorine. The amount of halogen in a halogenated neopentyl alcohol or phenol may vary widely although as a general rule, the halogenated monohydric compound contains 1 to about 4 chlorine or bromine atoms. Tribromoneopentyl alcohol and dibromophenol are preferred monohydric reactants.

In the first step of the reaction, essentially equal molar amounts of the phosphorus oxyhalide and monohydric compound are reacted. The phosphorus oxyhalide is considered to be a trifunctional compound with each of the three halogens being a reactive site, whereas the single hydroxyl group is the reactive site on the alcohol or phenol. After the reaction of essentially equal molar amounts of the monohydric compound and phosphorus oxyhalide, two of the active halides remain as sites for further reaction.

Any phosphorus oxyhalide may be employed in the present reaction with phosphorus oxychloride, phosphorus oxybromide and phosphorus oxyiodide being preferred. Phosphorus oxychloride is especially preferred.

The dihydric compound reacted with the reaction product of the first step of the reaction may suitably be isopropylidenediphenol, dihydroxydiphenyl oxide, dihydroxybiphenyl, dihydroxybenzene or their corresponding halogen substituted products containing 1 to about 6 bromine or chlorine atoms. Representative examples of such compounds include Bisphenol A, 3,3'-isopropylidenediphenol, 4,4'-, 2,4'- and 2,2'-dihydroxydiphenyl oxide, 4,4'-, 3,3'- and 2,4'-dihydroxybiphenyl, pyrocatechol, resorcinol, hydroquinone and their mono-, di-, tri- and tetrahalogenated products. Of these diols, tetrabromobisphenol A and 3,3'-dihydroxydiphenyl oxide are preferred.

The reaction conditions required to prepare the compounds of the invention are generically known. The preparation of the compounds of the present invention closely parallels that of similar compounds known in the art although the reaction in the present invention utilizes a novel method of addition and prepares novel compounds. Suitably, the reaction is conducted in the presence of pyridine at the reflux temperature of the reactants in dry benzene under atmospheric pressure.

The reaction of the dihydric compound in the present invention is continued for a period of time which gives the desired molecular weight. In the general formula above, $n$ is equal to 1 to 9. Although $n$ is an integer for each single molecule, the average value of $n$ for a large number of molecules is usually not an integer. Preferred compounds in the present invention have a molecular weight of about 1,000 to about 10,000.

The compounds of the present invention are especially useful as fire retardants, with the halogenated compounds being especially preferred for this purpose. In addition to being highly effective fire retardants, the compounds of the invention are soluble in a number of normally available organic solvents; they are compatible with a wide variety of substrates; they have low volatility; they degrade at unusually high temperatures and the degradation products of the compounds have a low volatility thereby imparting to the substrate substantial and continuing fire retardant characteristics even above degradation temperatures.

SPECIFIC EMBODIMENTS

EXAMPLE 1

A flask was charged with 15.6 g. (0.1 mole) of phosphorus oxychloride and 24.0 g. (0.3 mole) of pyridine. To the mixture formed in the reaction flask, 32.5 g. (0.1 mole) of 3-bromo-2,2-dibromomethylpropanol hereinafter tribromoneopentyl alcohol and dry benzene was added to the mixture and refluxed until no more pyridine hydrochloride precipitated. After this first step of the reaction was completed, 54.4 g. (0.1 mole) of tetrabromobisphenol A in 200 ml. of dry benzene was added and the mixture was refluxed overnight. After reflux, the reaction solution was cooled and the solid pyridine hydrochloride was removed by simple filtration. The filtrate was washed with 100 ml. of aqueous sodium carbonate and then twice with 100 ml. portions of water. The remaining benzene solution was then dried over magnesium sulfate and the solvent was removed on a rotary evaporator to yield a white powder weighing 86.5 g. after being dried in a vacuum oven. The product recovered accounted for 93 percent of the initial reactants charged into the reactor. The white powder was found to be very soluble in benzene, methylene chloride and chloroform but was insoluble in carbon tetrachloride. The powder had a melting point of 88° to >140°C. and was found to have an average molecular weight of about 1660 using gel chromatography.

EXAMPLE 2

In the same manner as described in Example 1, equivalent amounts of phosphorus oxychloride and tribromoneopentyl alcohol were reacted to form the monoesterified oxychloride. The product of this first reaction step was reacted in the same manner as described in Example 1 with 3,3'-dihydroxydiphenyl oxide in 200 ml. of benzene. The reaction mixture was refluxed overnight and worked up as described in Example 1. A light yellow amorphous solid was obtained which had a melting point of about 50° to about 80°C. and a molecular weight of about 1440 to about 1540. The product accounted for 90 percent of the total reactants added to the reaction.

EXAMPLE 3

In the same manner as described in Example 1, a 2 liter flask was charged with 15.6 g. (0.1 mole) of phosphorus oxychloride and 24.0 g. (0.3 mole) of pyridine. To this stirred mixture, 32.4 g. (0.1 mole) of 2,4-dibromophenol were added in 100 ml. of benzene. The solution was refluxed for 6 hours and then 54.4 g. (0.1 mole) of tetrabromobisphenol A in 600 ml. of benzene was added and the mixture was refluxed overnight. The product was worked up in the same manner as described in the examples above to give 84.7 g. of product having a melting point of 75°-130°C. and an average molecular weight of about 3300.

EXAMPLE 4

In the same manner as described in Example 3, three runs were carried out wherein 33.1 g. (0.1 mole) of tribrominated phenol was reacted with phosphorus oxychloride. The products of these reactions were each reacted with an equivalent amount of tetrabromobisphenol A to obtain after work-up a solid product having a melting point of 80°-120°C. The average molecular weights of the three products were 1440, 1560 and 4000.

EXAMPLE 5

The product prepared in Example 1 above was dissolved in methylene chloride to form a 20 percent by weight solution, and the solution was used to impregnate wood and latex. At a 20 to 30 percent add-on by weight, wood did not support combustion when a flame from a Bunsen burner was removed from the treated wood and the treated latex with about a 10 percent add-on showed substantially improved fire retardant properties. Also, when the materials prepared in Example 1 were added to polyesters and polyurethanes in amounts of about 5 to 10 percent by weight, good self-extinguishing characteristics were noted.

In the same manner as described by the examples above, equivalent amounts of phosphorus oxychloride, phosphorus oxybromide or phosphorus oxyiodide may be reacted with phenol or neopentyl alcohol to replace one of the halogens on the phosphorus oxyhalide. The compounds obtained in this first step may then be reacted with bisphenol A, 4,4'-dihydroxybiphenyl, resorcinol, 2,2'-dihydroxydiphenyl oxide or 4,4'-dihydroxydiphenyl oxide to give an unhalogenated compound corresponding to the general formula of the compounds of the present invention. This compound may then be halogenated with bromine, chlorine or bromine chloride to give the corresponding halogenated compounds of the present invention.

Thus, tribromoneopentyl alcohol, trichloroneopentyl alcohol or chlorobromoneopentyl alcohol may be employed. These halogenated and mixed alcohols and glycols are known. For example, the preparation of the mixed variety is outlined in F. Govaert and M. Beyaert, *Natuurw. Tijdschr.*, 22, 73–4 (1940); C.A. 37, 3054[8] (1943); they are referred to in *The Pentaerythritols*, E.

Berlow, R. H. Barth, J. E. Snow, Reinhold Publishing Corporation, N.Y., N.Y. (1958) at page 106.

I claim:

1. Compounds having the general formula

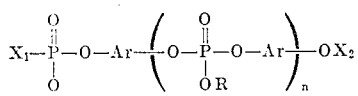

wherein
R = neopentyl, halogenated neopentyl, phenyl or halogenated phenyl; wherein each halogen is independently Br or Cl;
Ar = isopropylidenediphenylene, halogenated isopropylidenediphenylene, oxydiphenylene, halogenated oxydiphenylene, biphenylene, halogenated biphenylene, phenylene and halogenated biphenylene; wherein each halogen is independently Br or Cl; provided that at least one R or Ar is halogenated;

$X_1 = Cl, Br, I, OR, OArOH$;

$X_2 = H$ or $-\overset{O}{\underset{O}{\overset{\|}{P}}}-A$, where $A = Cl, Br, I$ or $OR$; and $n = 1-9$ 2. The compounds of claim 1 wherein R is tribromoneopentyl, dibromophenyl or tribromophenyl.
3. The compounds of claim 1 wherein Ar is 4,4'-isopropylidenetetrabromodiphenylene or 3,3'-diphenylene oxide.
4. The compounds of claim 1 having a molecular weight of 1,000 to 10,000.

* * * * *

UNITED STATES PATENT OFFICE
CERTIFICATE OF CORRECTION

Patent No. 3,761,543          Dated September 25, 1973

Inventor(s) Jeffrey A. Gunsher

It is certified that error appears in the above-identified patent and that said Letters Patent are hereby corrected as shown below:

The formulas appearing in the Abstract; Col. 1, line 43; and in Col. 5, line 8, each should read:

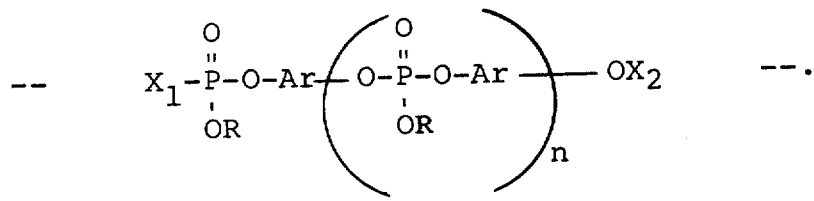

In the Abstract; Col. 1, line 61; and in Claim 1, appearing in Col. 6, line 8, each "$X_2 = H$ or $-\overset{O}{\underset{|}{P}}-A$," should read:

-- $X_2 = H$ or $-\overset{O}{\underset{\underset{OR}{|}}{\overset{\|}{P}}}-A$, --.

Signed and sealed this 2nd day of April 1974.

(SEAL)
Attest:

EDWARD M. FLETCHER, JR.          C. MARSHALL DANN
Attesting Officer                 Commissioner of Patents